United States Patent
Lu (10) Patent No.: US 8,418,332 B2
(45) Date of Patent: *Apr. 16, 2013

(54) METHOD OF TEXTURING A BEARING SURFACE OF A ROLLER CONE ROCK BIT

(75) Inventor: Xiaobin Lu, Coppell, TX (US)

(73) Assignee: Varel International Ind., L.P., Carrollton, TX (US)

( * ) Notice: Subject to any disclaimer, the term of this patent is extended or adjusted under 35 U.S.C. 154(b) by 706 days.

This patent is subject to a terminal disclaimer.

(21) Appl. No.: 12/398,730

(22) Filed: Mar. 5, 2009

(65) Prior Publication Data

US 2009/0232434 A1 Sep. 17, 2009

Related U.S. Application Data

(60) Provisional application No. 61/036,785, filed on Mar. 14, 2008.

(51) Int. Cl.
*B21C 37/30* (2006.01)
*C21D 7/06* (2006.01)

(52) U.S. Cl.
USPC ..... 29/90.7; 29/898.1; 29/898.12; 29/898.13; 72/53; 384/625

(58) Field of Classification Search ............ 29/90.7, 29/90.01, 898, 898.12, 898.13, 898.1, 898.11; 72/53; 175/337, 339, 371; 384/625
See application file for complete search history.

(56) References Cited

U.S. PATENT DOCUMENTS

| | | | |
|---|---|---|---|
| 2,697,014 A | 12/1954 | Boice et al. | |
| 3,839,774 A | 10/1974 | Jackson, Jr. | |
| 4,248,485 A | 2/1981 | White et al. | |
| 4,619,534 A | 10/1986 | Daly et al. | |
| 4,708,752 A | 11/1987 | Kar | |
| 5,485,890 A | 1/1996 | Cawthorne et al. | |
| 5,535,838 A | 7/1996 | Keshavan et al. | |
| 5,592,840 A * | 1/1997 | Miyasaka | 72/53 |
| 5,816,088 A | 10/1998 | Yamada et al. | |
| 5,944,125 A | 8/1999 | Byrd | |
| 6,446,520 B1 * | 9/2002 | Nagai et al. | 74/89.33 |
| 6,508,093 B2 | 1/2003 | Berthelet et al. | |
| 6,598,689 B1 | 7/2003 | Slaughter, Jr. et al. | |
| 6,881,500 B2 | 4/2005 | Sugiyama | |
| 7,052,400 B2 | 5/2006 | Kura et al. | |
| 7,128,171 B2 | 10/2006 | Dick et al. | |

(Continued)

FOREIGN PATENT DOCUMENTS

| | | |
|---|---|---|
| WO | WO 03/040591 | 5/2003 |
| WO | WO 2007/146276 A1 | 12/2007 |

OTHER PUBLICATIONS

Written Opinion of the International Searching Authority, International Application No. PCT/US2009/037006, dated Nov. 11, 2009.

(Continued)

*Primary Examiner* — Sarang Afzali

(74) *Attorney, Agent, or Firm* — Gardere Wynne Sewell, LLP (57) ABSTRACT

Surface texturing is employed to modify the topography of one or more surfaces (radial or cylindrical) of the bearing system for a roller cone rock bit. The surface texturing results in a dimpled surface which retains additional lubricant helpful in reducing friction in the boundary and mixed lubrication regimes. Shot peening is disclosed as one method for texturing the desired surface.

23 Claims, 10 Drawing Sheets

U.S. PATENT DOCUMENTS

| | | | |
|---|---|---|---|
| 7,338,379 B2 * | 3/2008 | Mancuso et al. | 464/32 |
| 7,582,174 B2 | 9/2009 | Vigneau | |
| 7,703,312 B2 | 4/2010 | David | |
| 7,708,090 B2 | 5/2010 | Zahradnik et al. | |
| 7,762,113 B2 * | 7/2010 | Prevey, III | 72/53 |
| 8,062,094 B2 * | 11/2011 | Cisek et al. | 451/33 |
| 2004/0265620 A1 | 12/2004 | Sugiyama | |
| 2005/0252691 A1 | 11/2005 | Bramlett et al. | |
| 2006/0243494 A1 | 11/2006 | Koltermann et al. | |
| 2007/0081747 A1 | 4/2007 | Dick et al. | |
| 2007/0284150 A1 | 12/2007 | Lin | |
| 2009/0232428 A1 | 9/2009 | Lu | |
| 2010/0038144 A1 | 2/2010 | Stauffer | |
| 2010/0071960 A1 | 3/2010 | Curry et al. | |
| 2010/0089657 A1 | 4/2010 | Lin | |
| 2011/0048810 A1 | 3/2011 | Lin et al. | |

OTHER PUBLICATIONS

Wang, Q. Jane, et al., "Virtual Texturing: Modeling the Performance of Lubricated Contacts of Engineered Surfaces", Transactions of the ASME, vol. 127, Oct. 2005, pp. 722-728.

Etsion, I et al., "Analytical and Experimental Investigation of Laser-Textured Mechanical Seal Faces", Tribology Transactions, vol. 42, (1999), 3, pp. 511-516.

Xiaobin, Lu et al., "An Experimental Investigation of Dimple Effect on the Stribeck Curve of Journal Bearings", Tribol Lett (2007) 27:169-176, DOI 10.1007/s11249-007-9217-x.

International Search Report, PCT/US2009/037006, Nov. 11, 2009, 3 pages.

Written Opinion of the International Searching Authority, PCT/US2009/037006, Nov. 11, 2009, 7 pages.

Singapore Written Opinion mailed Sep. 21, 2011 for SG 201006656-1 (13 pages).

Wang, Jane Q. et al., Virtual Texturing: Modeling the Performance of Lubricated Contacts of Engineered Surfaces, Transactions of the ASME, vol. 127, Oct. 2005, pp. 722-728.

Etsion, I et al., Analytical and Experimental Investigation of Laser-Textured Mechanical Seal Faces, Tribology Transactions, vol. 42, (1999), 3, pp. 511-516.

Xiaobin, Lu et al., An Experimental Investigation of Dimple Effect on the Stribeck Curve of Journal Bearings, Tribol Lett, (2007), 27:169-176, DOI, 10.1007/s11249-007-9217-x.

Gulf Publishing Company, Excerpt from "Seals and Sealing Handbook", pp. 24-25, Jun. 1, 1981.

Khonsari, Michael M., et al., Applied Tribology, Bearing Design and Lubrication, A Wiley-Interscience Publication, Finite Journal Bearing Design and Analysis, p. 229, Feb. 19, 2001.

SG Written Opinion dated Dec. 13, 2011 for SG 201006654-6 (11 pages).

\* cited by examiner

FIG. 19

METHOD OF TEXTURING A BEARING SURFACE OF A ROLLER CONE ROCK BIT

PRIORITY CLAIM

This application claims the benefit of United States Provisional Application for Patent Ser. No. 61/036,785 filed Mar. 14, 2008, the disclosure of which is hereby incorporated by reference.

TECHNICAL FIELD

The present invention relates generally to earth boring bits, and more particularly to roller cone rock bits.

BACKGROUND

A roller cone rock bit is the cutting tool used in oil, gas, and mining fields to break through the earth formation to shape a well bore. Load and motion of the bit are transferred to the bearings inside three head and cone assemblies. For the bit where a journal bearing is employed, the main journal bearing is charged with as much as 80 percent of the total radial load. The main journal bearing is composed of the head (as the shaft), the bushing, and the cone (as the housing). Due to high load (>10,000 lb) and low speed (70-250 rpm), the bearing operates in the boundary or the mixed lubrication regime in which the head is not completely separated from the bushing. Load is supported by both asperity contact and hydrodynamic pressure. The grease constrained among those asperities is the effective lubricating medium and its amount is quite limited. It is not unusual for the bearing to experience grease starvation in the contact zone. Thereafter the bearing often undergoes scoring, scuffing, even catastrophic failure like galling or seizure. It is desirable that more grease be trapped between the head and bushing at the contact interface in order to reduce friction.

Figure 1A:
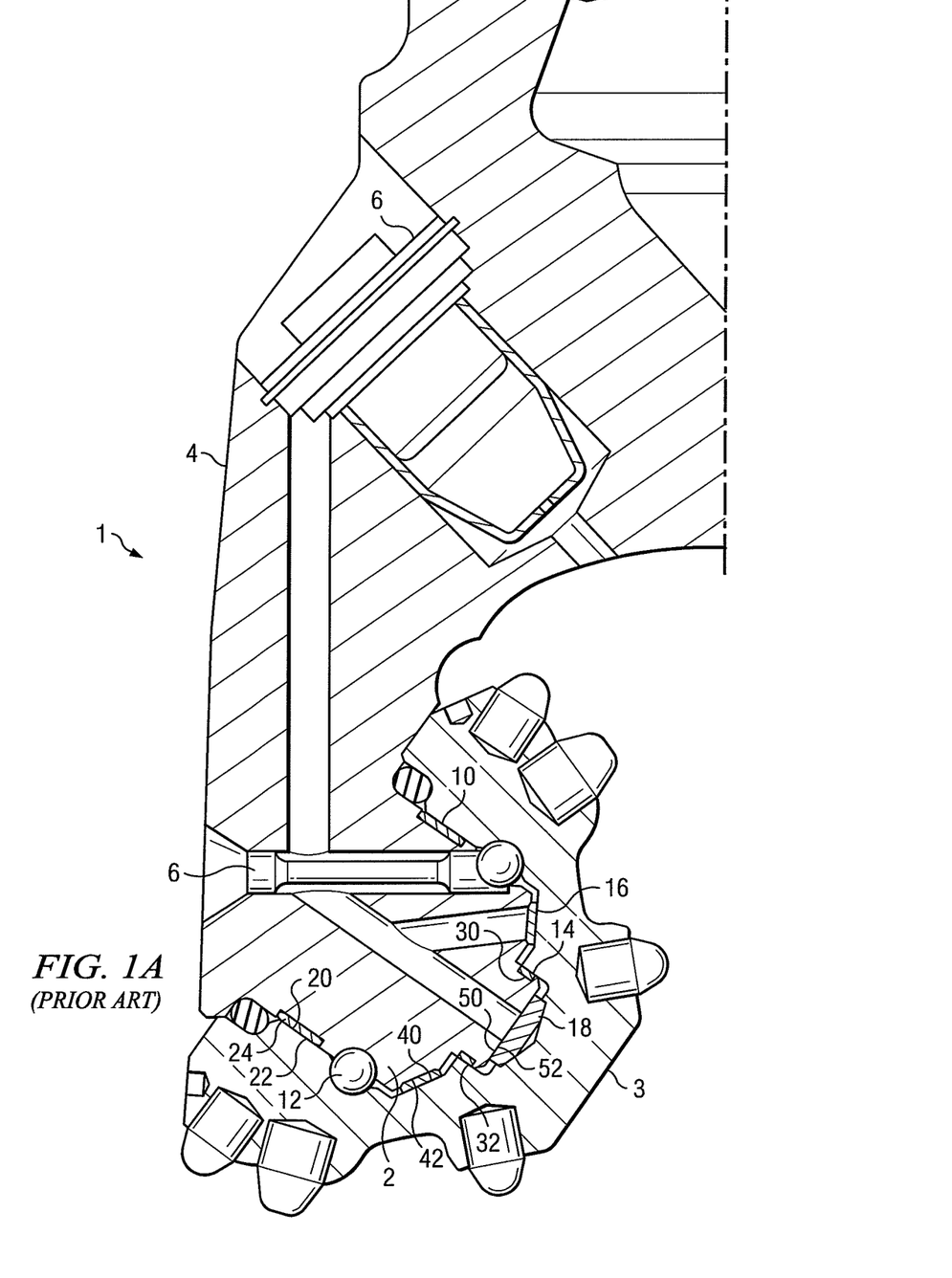
FIG. 1A illustrates a partially broken away view of a typical roller cone rock bit.

Reference is made to FIG. 1A which illustrates a partially broken away view of a typical roller cone rock bit. FIG. 1A more specifically illustrates one head and cone assembly. The general configuration and operation of such a bit is well known to those skilled in the art.

The head 1 of the bit includes the bearing shaft 2. A cutting cone 3 is rotatably positioned on the bearing shaft 2 which functions as a journal. A body portion of the bit includes an upper threaded portion forming a tool joint connection 4 which facilitates connection of the bit to a drill string (not shown). A lubrication system 6 is included to provide lubrication to, and retain lubricant in, the journal bearing between the cone 3 and the bearing shaft 2. This system 6 has a configuration and operation well known to those skilled in the art.

A number of bearing systems are provided in connection with the journal bearing supporting rotation of the cone 3 about the bearing shaft 2. These bearing systems include a first cylindrical friction bearing 10 (also referred to as the main journal bearing herein), ball bearings 12, second cylindrical friction bearing 14, first radial friction (thrust) bearing 16 and second radial friction (thrust) bearing 18.

Figure 1B:
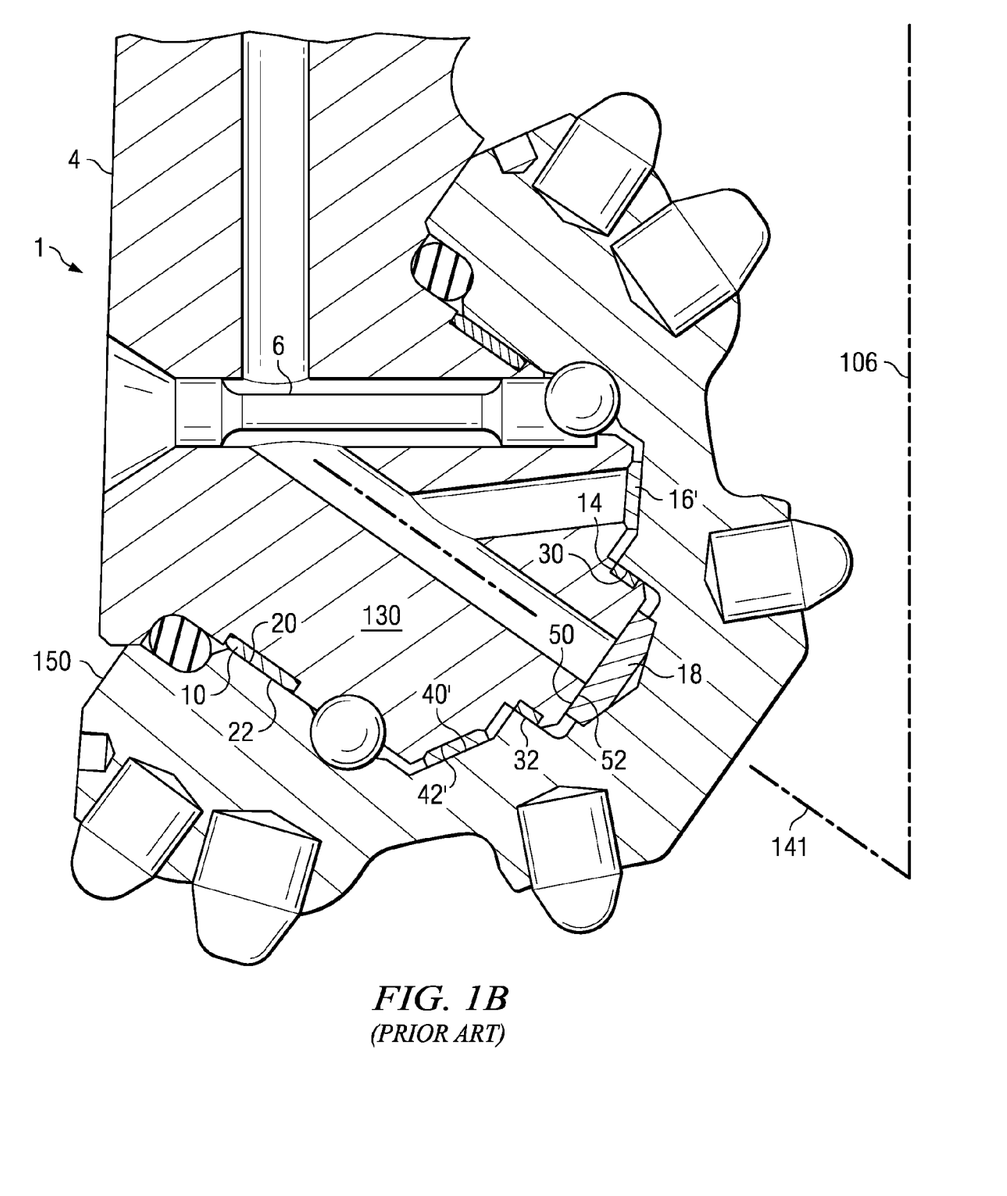
FIG. 1B illustrates of a partially broken away view of another typical roller cone rock bit.

With reference to FIG. 1B, there is shown an illustration of a partially broken away view of another typical roller cone rock bit. Reference 141 refers to the axis of rotation for the cone 150 on the head shaft 130. Reference 106 refers to central rotating axis of the bit itself. Like reference numbers refer to like or similar parts. It will be noted here that a tapered thrust bearing 16' is used.

Figure 2:
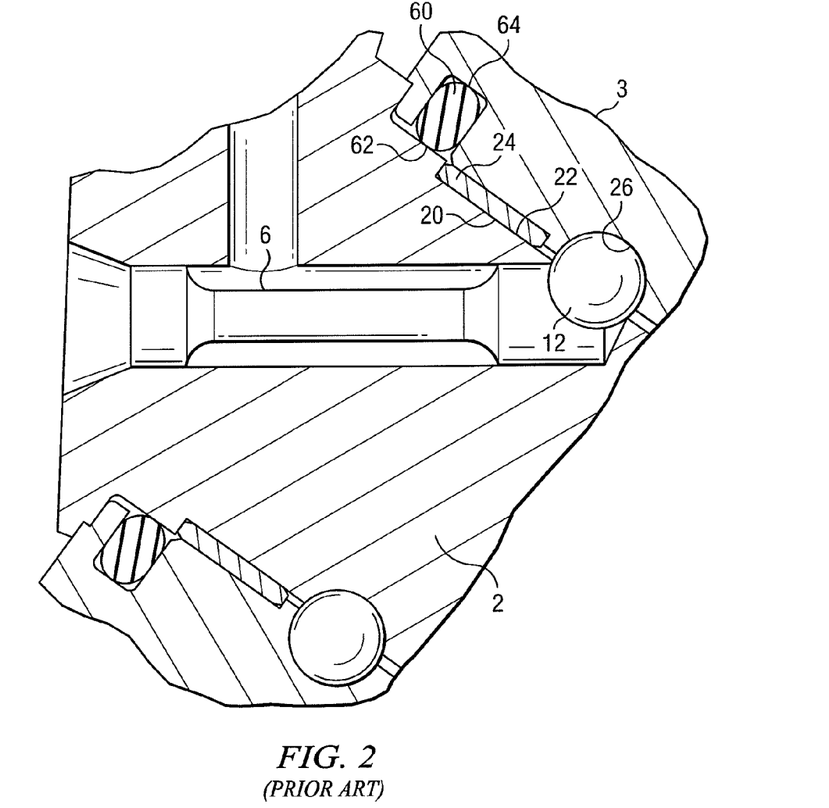
FIG. 2 illustrates a partially broken away view of FIG. 1A showing the bearing system in greater detail.

FIG. 2 illustrates a partially broken away view of FIG. 1A showing the bearing system in greater detail. The first cylindrical friction bearing 10 is defined by an outer cylindrical surface 20 on the bearing shaft 2 and an inner cylindrical surface 22 of a bushing 24 which has been press fit into the cone 3. This bushing 24 is a ring-shaped structure typically made of beryllium copper, although the use of other materials is known in the art. The ball bearings 12 ride in an annular raceway 26 defined at the interface between the bearing shaft 2 and cone 3. The second cylindrical friction bearing 14 is defined by an outer cylindrical surface 30 on the bearing shaft 2 and an inner cylindrical surface 32 on the cone 3. The outer cylindrical surface 30 is inwardly radially offset from the outer cylindrical surface 20. The first radial friction bearing 16 is defined between the first and second cylindrical friction bearings 10 and 12 by a first radial surface 40 on the bearing shaft 2 and a second radial surface 42 on the cone 3. The second radial friction bearing 18 is adjacent the second cylindrical friction bearing 12 at the axis of rotation for the cone and is defined by a third radial surface 50 on the bearing shaft 2 and a fourth radial surface 52 on the cone 3.

An o-ring seal 60 is positioned between cutter cone 3 and the bearing shaft 2. A cylindrical surface seal boss 62 is provided on the bearing shaft. In the illustrated configuration, this surface of the seal boss 62 is outwardly radially offset (by the thickness of the bushing 24) from the outer cylindrical surface 20 of the first friction bearing 10. It will be understood that the seal boss could exhibit no offset with respect to the main journal bearing surface if desired. An annular gland 64 is formed in the cone 3. The gland 64 and seal boss 62 align with each other when the cutting cone 3 is rotatably positioned on the bearing shaft. The o-ring seal 60 is compressed between the surface(s) of the gland 64 and the seal boss 62, and functions to retain lubricant in the bearing area around the bearing systems and prevents any materials (drilling mud and debris) in the well bore from entering into the bearing area.

With reference once again to FIG. 1B, the tapered thrust friction bearing 16' is defined between the first and second cylindrical friction bearings 10 and 12 by a first conical surface 40' on the bearing shaft 130 and a second conical surface 42' on the cone 150. The features of FIG. 1B are otherwise generally the same as in FIGS. 1A and 2.

While the surfaces have in some instances been referred to as cylindrical or radial, and have been shown as linear, it will be understood that other surface geometries (for example, non-linear geometries neither parallel with nor perpendicular to the axis 141 of cone rotation, such as toroidal or otherwise curved) as are known to those skilled in the art may used for the bearing and thrust surfaces.

Load in the bearing system is supported by both asperity contact and hydrodynamic pressure. Lubricant is provided in the first cylindrical friction bearing 10, second cylindrical friction bearing 14, first radial friction bearing 16 (or tapered thrust bearing 16') and second radial friction bearing 18 between the implicated cylindrical and radial surfaces using the system 6. However, it is not unusual for the bearing to experience grease starvation in these surface contact zones of the bearing system. This can result in scoring, scuffing, and even catastrophic failure like galling or seizure. There is a need to retain lubricant in position trapped between the implicated and opposed cylindrical and radial surfaces of the bearing system.

Reference is made to the following prior art documents: U.S. Pat. Nos. 3,839,774 (Oct. 8, 1974), 4,248,485 (Feb. 3, 1981) and 5,485,890 (Jan. 23, 1996); U.S. Publication 2005/

0252691 (Nov. 17, 2005); and PCT Publication WO 2007/146276 (Dec. 21, 2007), the disclosures of which are hereby incorporated by reference.

SUMMARY

To address issues of grease starvation and possible bearing failure, it is desired to increase the amount of lubricant that can be maintained in the surface contact zones of the bearing system. In an effort to introduce more lubricant into these surface contact zones, the surface topography of the bearing system is modified in the manner described below.

Surface texturing is employed to modify the topography of one or more surfaces (without limitation, for example, radial or cylindrical) of the bearing system for a rock bit. Innovative methods and apparatus are described with respect to certain features of surface texturing and its beneficial effect on reducing bearing friction and prolonging bit life. These features address deficiencies of the prior art with respect to the configuration and operation of the main journal bearing surfaces as well as the pilot pin bearing surfaces and thrust bearing surfaces.

Due to heavy load and low velocity, the head shaft and the bushing of the main journal bearing are in contact at the loading side of the bearing system. This metal-to-metal contact dominates the frictional behavior of the bearing system. The friction coefficient can normally reach over 0.1, which generates enormous heat and can lead to bearing and seal failure. To improve the bearing life, the friction has to be reduced. In a mixed lubrication regime, there are two means to create better lubrication in these surface contact areas: supply more grease or generate greater hydrodynamic pressure.

In accordance with an embodiment, the topography of the head bearing system is modified by surface texturing technology. A surface texture is introduced, either on the head side or on the bushing (or cone) side (or both), of the bearing system for the roller cone rock bit. The surface texturing disclosed herein includes dimples which retain additional lubricant and are thus helpful to reduce the friction in the boundary and mixed lubrication regimes.

Surface texturing as described herein creates specially patterned dimples on one or more surfaces of the bearing system. Reference is once again made to FIGS. 1A and 2 for an identification of possible textured surfaces in the bearing system in accordance with embodiments described herein. In one implementation, the surface texturing is provided on an outer cylindrical surface 20 of the bearing shaft 2 which forms part of the first cylindrical friction bearing 10. In another implementation, the surface texturing is provided on an inner cylindrical surface 22 of the bushing 24 which has been press fit into the cone 3 and which forms part of the first cylindrical friction bearing 10. In yet another implementation, the surface texturing is provided on an outer cylindrical surface 30 of the bearing shaft 2 which forms part of the second cylindrical friction bearing 14. In still another implementation, the surface texturing is provided on an inner cylindrical surface 32 of the cone 3 which forms part of the second cylindrical friction bearing 14. In another implementation, the surface texturing is provided on a first radial surface 40 (or conical surface 40') of on the bearing shaft 2 which forms part of the first radial friction bearing 16 (bearing 16'). In yet another implementation, the surface texturing is provided on a second radial surface 42 (or conical surface 42') of the cone 3 which forms part of the first radial friction bearing 16 (bearing 16'). In still another implementation, the surface texturing is provided on a third radial surface 50 of the bearing shaft 2 which forms part of the second radial friction bearing 18. In yet another implementation, the surface texturing is provided on a fourth radial surface 52 of the cone 3 which forms part of the second radial friction bearing 18. Any combination of the foregoing textured surfaces, with untextured surfaces, may also be used.

The dimples of the surface texturing behave as lubricant reservoirs which permeate the lubrication into the inter-space of metal asperities. Meanwhile, higher hydrodynamic pressure is generated on the dimple area. Both functions facilitate an improvement in bearing system lubrication with a reduction in friction. It is preferred that the dimples of surface texture cover between 60-100% of the contact bearing surface of interest. Even more preferably, the dimples should cover between 70-90% of the surface of interest. In an implementation, the dimples cover substantially 100% of the surface of interest.

Embodiments herein utilize any one or more of a variety of methods to create surface texturing including: machining, chemical etching, laser texturing, deep rolling, vibratory finishing, etc. Controllability, uniformity, cost, coverage area, dimple size, dimple depth, and dimple shape are the factors which determine which method is selected to form the texturing.

In a preferred implementation, shot peening is used to create the dimples of the surface texturing. More specifically, a two-step shot peening process is used. In accordance with this two-step process, in a first step the bearing system surface to be treated is exposed to a first shot peening action wherein the surface is bombarded at a first intensity level by small spherical media (the "shot") of a first average size. In a second step the same bearing system surface being treated is exposed to a second shot peening action at a second intensity level wherein the surface is bombarded by small spherical media (the "shot") of a second average size. Preferably, the second intensity level is reduced from the first intensity level. Preferably, the second average size is smaller than the first average size.

In a preferred implementation, each step of the two-step shot peening process is effectuated to achieve a peened coverage area of between 60-100%. When peened coverage areas of less than 100% are used in each step, the goal is to achieve a final peened coverage area with respect to the treated surface of at least 60%, and more specifically 70-90% and even more preferably which approaches or reaches substantially 100%.

It will further be understood that the shot peening process could utilize more than two separate peening actions. For example, a three-step, four-step, or more-step process could be used. Each step would preferably utilize different average sized media and different intensity levels.

Disclosure is also made of an intermittent type of texturing for bearing surfaces wherein not all of a given surface receives the surface texturing treatment.

DETAILED DESCRIPTION OF THE DRAWINGS

Surface texturing is employed to modify the topography of one or more surfaces (radial or cylindrical) of the bearing system for a roller cone rock bit. The surface texturing results in a dimpled surface which retains additional lubricant helpful in reducing friction in the boundary and mixed lubrication regimes. Surface coverage area for the dimpled texture should exceed at a minimum 60%, more preferably be between 70-90%, and even more preferably approach or reach approximately 100%.

Reference is once again made to FIGS. 1 and 2 for an identification of textured surfaces in the bearing system to which this surface texturing is applied.

Turning first to the first cylindrical friction bearing 10, surface texturing is provided on one or the other or both of the outer cylindrical surface 20 on the bearing shaft 2 and the inner cylindrical surface 22 of the bushing 24 which has been press fit into the cone 3, these surfaces forming the first cylindrical friction bearing 10 (or main journal bearing).

With respect to the second cylindrical friction bearing 14, surface texturing is provided on one or the other or both of the outer cylindrical surface 30 of the bearing shaft 2 and the inner cylindrical surface 32 of the cone 3.

For the first radial friction bearing 16, surface texturing is provided on one or the other or both of the first radial surface 40 (or surface 40') of the bearing shaft 2 and the second radial surface 42 (of surface 42') of the cone 3.

Lastly, for the second radial friction bearing 18, surface texturing is provided on one or the other or both of the third radial surface 50 of the bearing shaft 2 and the fourth radial surface 52 of the cone 3.

Any combination of the foregoing textured surfaces, with desired untextured surfaces, may also be used.

The dimples of the surface texturing behave as lubricant reservoirs which permeate the lubrication into inter-space of metal asperities. Meanwhile, higher hydrodynamic pressure is generated on the dimple area. Both functions facilitate an improvement in bearing system lubrication.

Any one or more of a variety of methods can be used to create the dimpled surface texturing including: machining, chemical etching, laser texturing, deep rolling, vibratory finishing, shot peening, etc. Controllability, uniformity, cost, coverage area, dimple size, dimple depth, and dimple shape factors which influence which method is selected for the surface texturing process.

The dimpled surface texture should be random and with uniform coverage. Preferably, different sized dimples should be present and should be randomly distributed across the surface. A finished coverage area of substantially 100% on the surface of interest is preferred. If the original surface is obliterated entirely by overlapped dimple texturing, then it can be said that 100% coverage area has been achieved. Additionally, the finished surface texture should lack any sharp edges which could contribute to undesirable metal-to-metal contact in the bearing system. It will be recognized, however, that benefits accrue from finished coverage areas on the surface of interest in excess of 60%, or more preferably between 70-90%, and on up approaching 100%.

In a preferred implementation, shot peening is chosen to form the dimpled surface texture through topology modification. Shot peening advantageously has characteristics of randomicity but with uniformity of coverage. Shot peening is also a controllable process so that only those desired surfaces will have a modified surface topography (this allows for a machined surface to exist adjacent to a peened surface). As known to those skilled in the art, shot peening is a cold working process in which the surface of a part is bombarded by small spherical media called shot. Each shot leaves a tiny dimple on the surface caused by impact. Shot peening is more widely used to create compressive stress so as to reduce fatigue crack. Inspired by the view that tiny dimples are generated on the surface, shot peening is employed as described herein for a different purpose in creating a dimpled surface texture which can constrain more lubricant in the bearing surface contact zone(s) and generate increased hydrodynamic pressure which better separates the bearing surfaces.

Any one or more of the surfaces 20, 22, 30, 32, 40, 42, 50 and 52 described above can be subjected to the shot peening treatment. In a preferred implementation, a two-step (dual) shot peening process is utilized on the surface(s) of interest.

In a first step, shot peening is performed on the surface using a first shot media at a first shot intensity. The shot peening action of the first step is performed for a first period of time in order to obtain a desired coverage area. The shot media is preferably cast steel which in an exemplary implementation has a first average size of 0.011 inches, and the intensity of the first step is 0.007~0.010C (measured by Almen strip). Alternatively, the shot media is glass bead for softer surfaces such as the inner cylindrical surface 22 of the first cylindrical friction bearing 10 on the bushing 24 (with an intensity of the first step being 0.008~0.012N). In an exemplary implementation, the glass media has an average size of 0.006 inches. The distinction between a hard surface and a soft surface may be made based, for example, on whether the hardness of the material exceeds a certain threshold (such as, for example, a hardness of HRC 45). In the implementation described above for the main journal bearing, the journal of hardened steel material has a hardness of HRC 58-62, while the bushing of beryllium copper has a hardness of about HRC 38.

Preferably, the peened coverage area resulting from completion of this first shot peening step after the first period of time is between 60% and 100%. Coverage in excess of 100% may also be provided. Coverage is defined as the extent (in percent) of complete texturing (for example, dimpling) of the surface by the process step. Thus, with 100% coverage the original surface texture of the surface which has been peened has been obliterated entirely by the first shot peening step.

Coverage in excess of 100% is obtained by extending the exposure time to peening beyond that time which is required to achieve 100% coverage. For example: a 200% coverage would be achieved by shot peening the surface for twice the amount of time necessary to obtain a 100% coverage.

Figure 3:
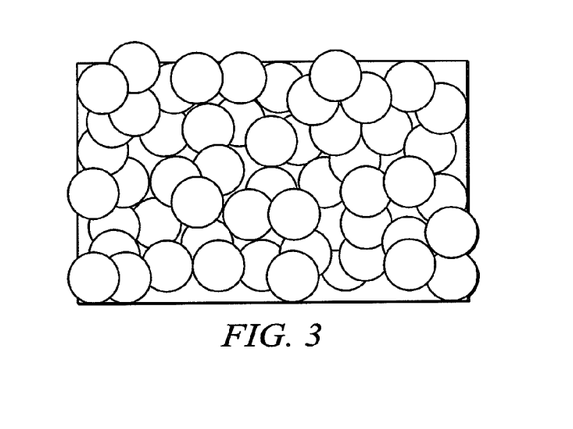
FIG. 3 illustrates an exemplary shot peening impact pattern.

FIG. 3 illustrates an exemplary impact pattern with respect to execution of the first shot peening step with at or about 100% coverage area.

Figure 4:
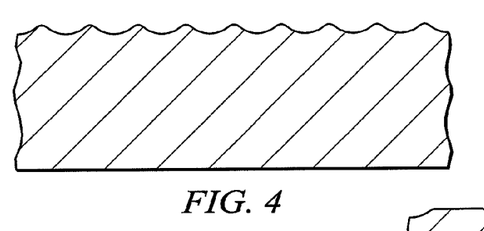
FIG. 4 illustrates, in cross-section, a surface of interest which has been treated by the shot peening of FIG. 3 at or about 100% coverage area.

FIG. 4 illustrates, in cross-section, a surface of interest which has been treated by the first shot peening step.

Figure 5:
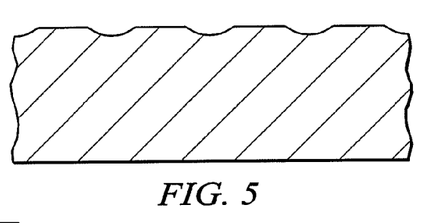
FIG. 5 illustrates, in cross-section, a surface of interest which has been treated by additional shot peening with a coverage area of less than 100%.

Conversely, FIG. 5 illustrates, in cross-section, a surface of interest which has been treated by the first shot peening step with a coverage area of less than 100% (i.e., for a shorter period of time).

In a second step, shot peening is performed on the surface (FIG. 4 or 5) resulting from completion of the first step using a second shot media at a second intensity. The shot peening action of the second step is performed for a second period of time in order to obtain a desired coverage area. The shot media is preferably cast steel having a second average size of 0.011 inches (which is smaller than the first average size), and the intensity of the second step is 0.007~0.010A (measured by Almen strip). Alternatively, the shot media is smaller glass bead for softer surfaces such as the inner cylindrical surface 22 of the first cylindrical friction bearing 10 on the bushing 24. Preferably, the peened coverage area resulting from completion of this second shot peening step is between 60% and 100%.

Figure 6:
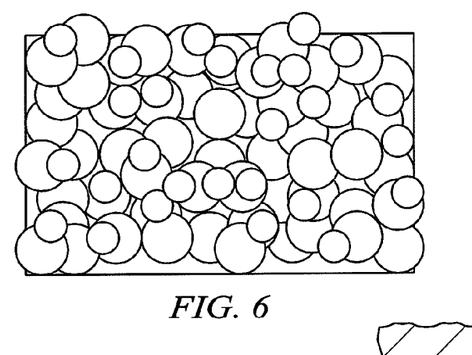
FIG. 6 illustrates an exemplary impact pattern with respect to execution of the additional shot peening.

FIG. 6 illustrates an exemplary impact pattern with respect to execution of the second shot peening step with less than 100% coverage area.

Figure 7:
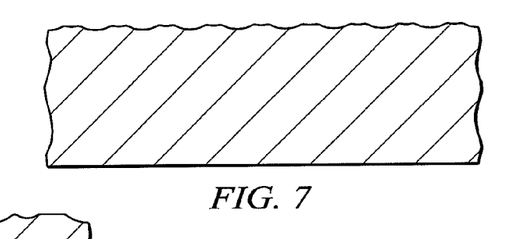
FIGS. 7, 8 and 9 illustrate, in cross-section, a surface of interest which has been treated by an additional shot peening process.

FIG. 7 illustrates, in cross-section, a surface of interest which has been treated by the second shot peening step (when starting from the first step result shown in FIG. 4) for a second period of time necessary to obtain substantially 100% coverage area.

Figure 8:
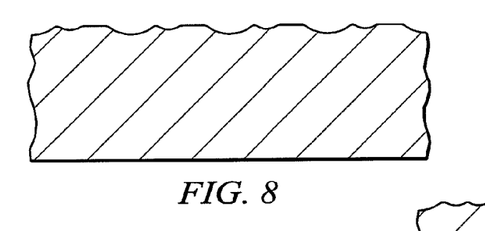

FIG. 8 illustrates, in cross-section, a surface of interest which has been treated by the second shot peening step (when starting from the first step result shown in FIG. 5). In this case, the second step has less than 100% coverage (due to exposure for a shortened second period of time).

Figure 9:
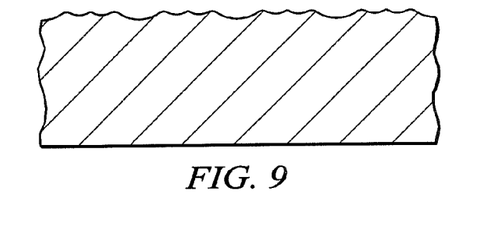

FIG. 9 illustrates, in cross-section, a surface of interest which has been treated by the second shot peening step (when starting from the first step result shown in FIG. 5). In this case, the second step has 100% coverage through selection of the requisite second period of time.

No matter what coverage area percentage is accomplished with the second shot peening, it is preferred that the second shot peening step at a minimum compact, as shown in FIG. 7, any sharp edges present in the surface texture resulting from completion of the first shot peening step (see FIGS. 4 and 5). This will result in an improved surface texturing finish wherein the possibility of metal-to-metal contact in the bearing system is reduced.

It is preferred that following completion of the shot peening treatment (both or more steps) of the surface of interest, that substantially 100% coverage area for combined first and second step surface treatment with dimpling be achieved. However, there are advantages to coverage areas of greater than 60%, 70-90%, and greater than 90%.

Although a two-step process is described, it will be understood that the shot peening process could utilize more than two separate peening actions. For example, a three-step, four-step, or more-step process could be used. Each step would preferably utilize different average sized media and different intensity levels.

For softer materials, for example at or below a hardness HRC45, only one shot peening step action may be necessary. Harder materials, however, benefit from the performance of two or more shot peening actions as described above.

It will be understood that the cross-sectional surface texture illustrations shown herein are schematic and exemplary in nature. The illustrated regularity and periodicity of the dimple shape and location shown in the FIGURES is not necessarily an accurate illustration of what an actual shot peened surface would look like in cross-section but rather is representative of the results achieved with the two step process. One skilled in the art will understand the topologies which result from each of the first and second steps given different respective first and second periods of time for the peening action.

It is known in the prior art to provide radial and cylindrical bearing system surfaces having a roughness of 8 to 16 microinches Ra. This would comprise a typical polished bearing surface of standard use (see, also, FIG. 12). As a result of the completion of the surface treatment process described herein, however, the shot-peened bearing surface of interest will have a surface finish roughness greater than 20 microinches Ra (see, also, FIG. 13).

Figure 10:
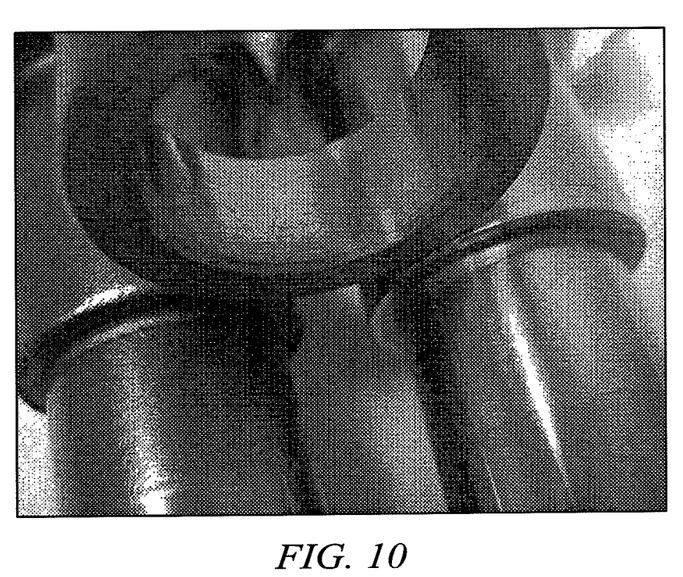
FIGS. 10 and 11 are images illustrating topography comparisons between surfaces that have subjected to a two-step shot peening process.
Figure 11:
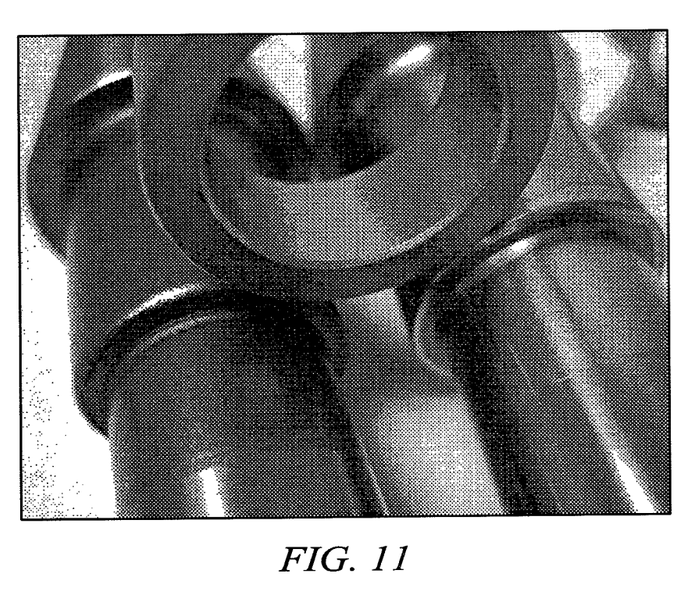

Reference is now made to FIG. 10 which is an image illustrating topography comparisons between surfaces that have been processed in accordance with the two-step shot peening process described above to have a surface roughness of greater than 20 microinches Ra (see, the bearing shaft on the left) and surfaces with conventional surface roughness of 8 to 16 microinches Ra (see, bearing shaft on the right and bushing inner surface at center). FIG. 11 is an image illustrating topography comparisons between surfaces that have been processed in accordance with the two-step shot peening process described above to have a surface roughness of greater than 20 microinches Ra (see, the bearing shaft on the left and bushing inner surface at center) and surfaces with conventional surface roughness of 8 to 16 microinches Ra (see, bearing shaft on the right).

Figure 12:
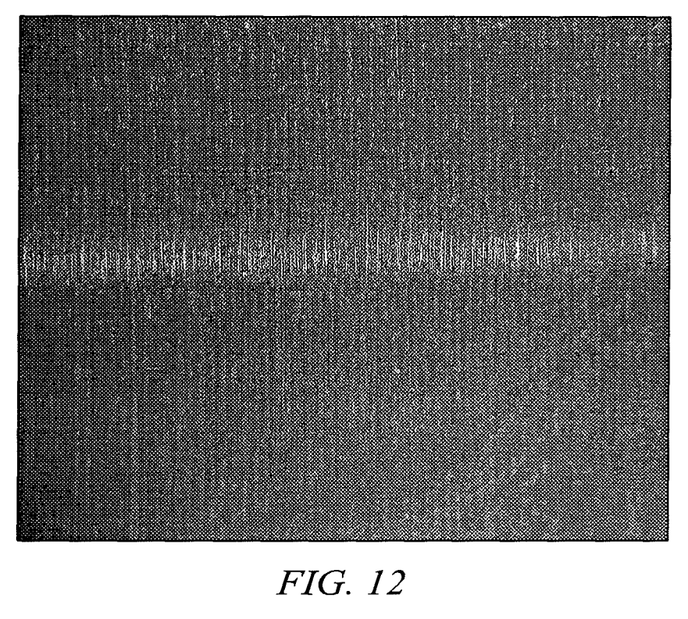
FIG. 12 is an image illustrating the topography of a regular machined surface.

FIG. 12 is an image illustrating the topography of a regular machined surface such as would be used in the prior art for a bearing system surface.

Figure 13:
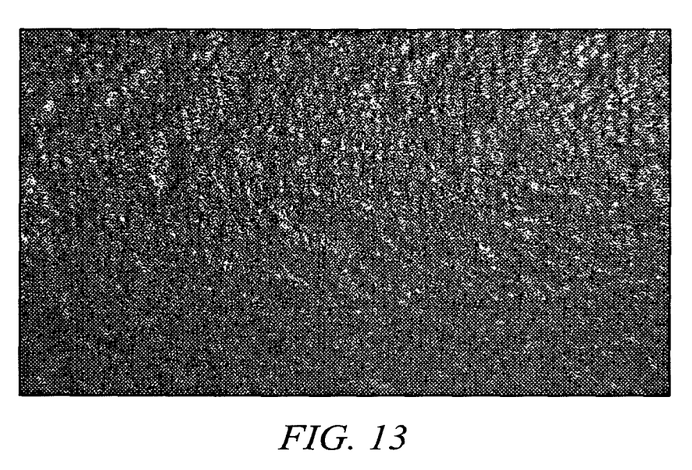
FIG. 13 is an image illustrating the topography of a two-step shot peened surface.

FIG. 13 is an image illustrating the topography of a two-step shot peened surface as produced in accordance with the description above.

Figure 14:
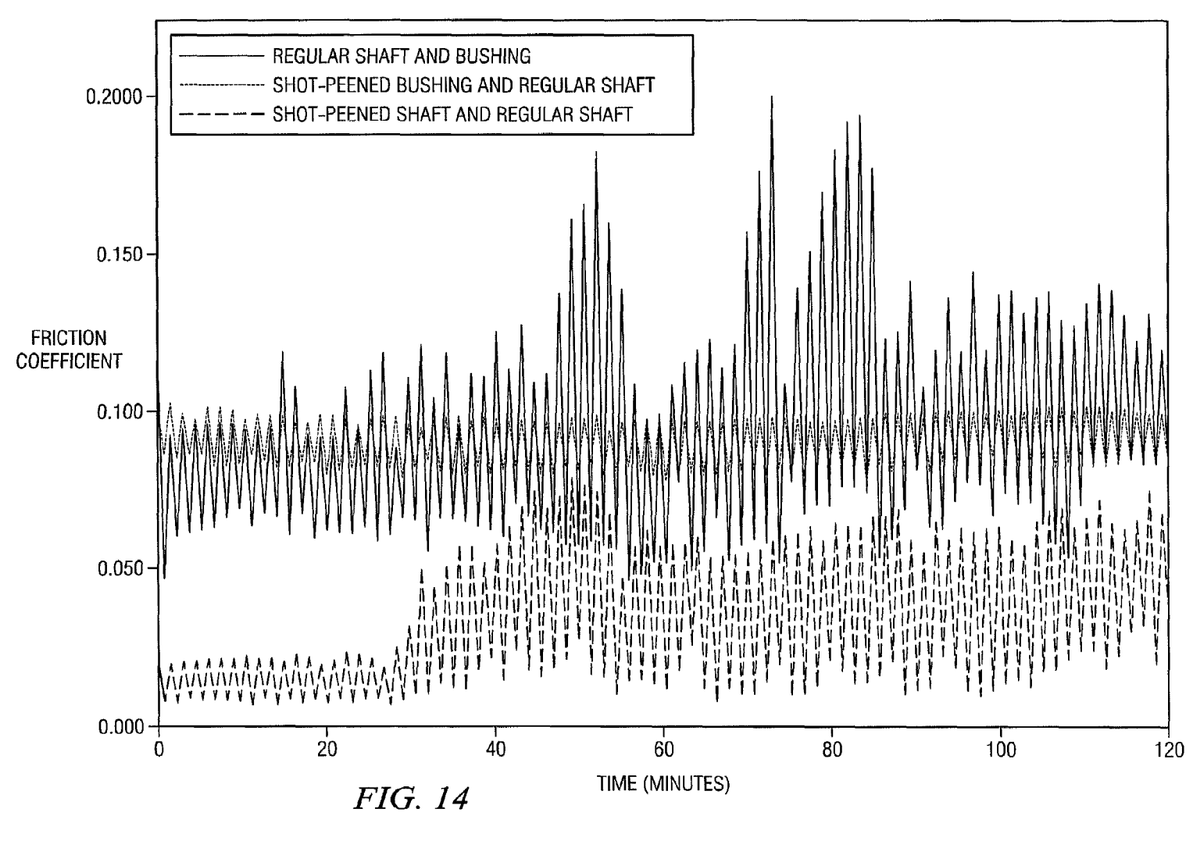
FIGS. 14, 15 and 16 illustrate the beneficial effect on the friction coefficient which accrues from surface texting.
Figure 15:
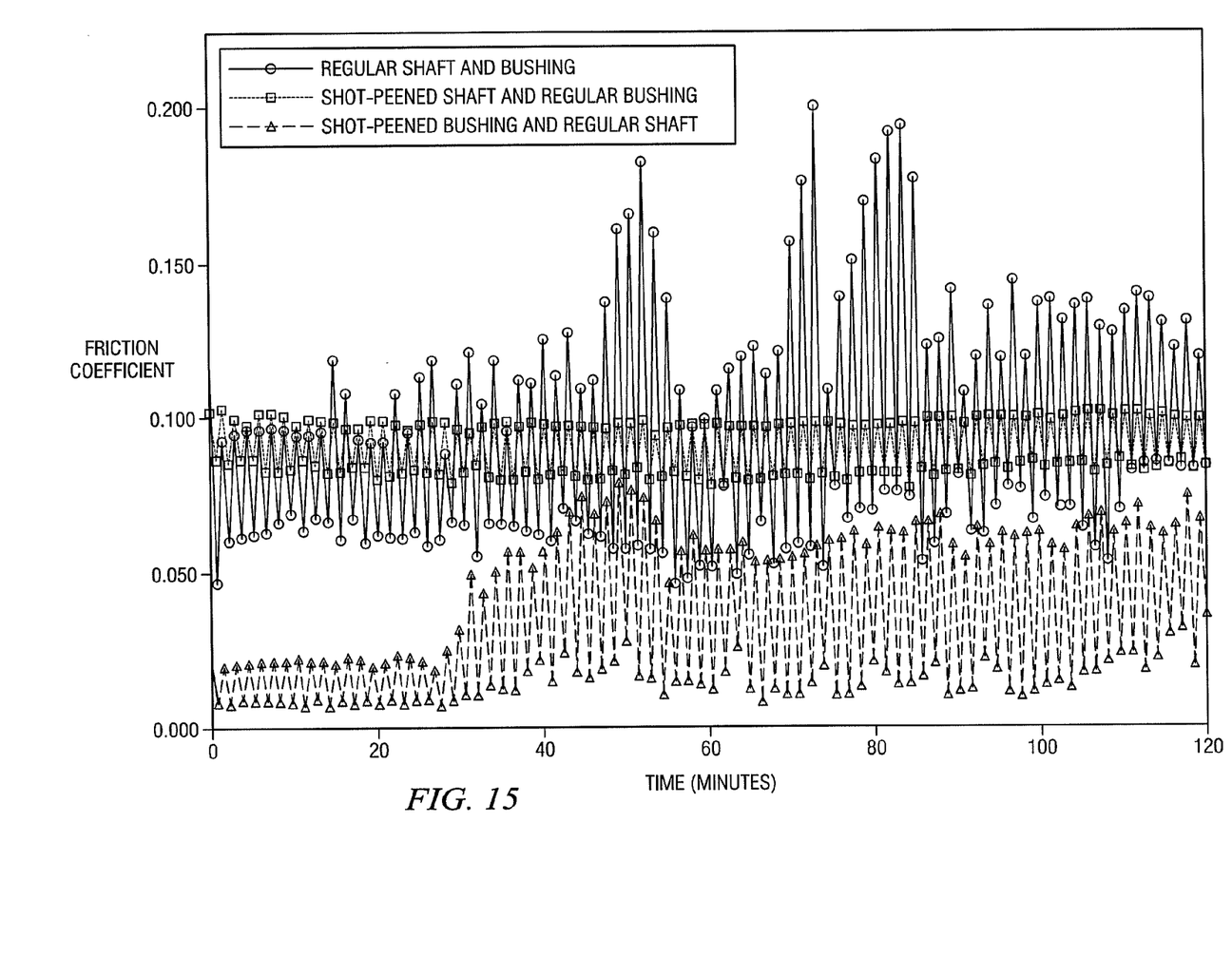

A conventional machined shaft with a conventional machined bushing (see surface of FIG. 12), a shot-peened shaft (see surface of FIG. 13) with a conventional machined bushing, and a conventional machined shaft with a shot-peened bushing, were tested on a bearing test rig under the same operating conditions. FIGS. 14 and 15 illustrate results of that testing and show the beneficial effect surface texting (in general) and two-step shot peening (in particular) in accordance with the process described above has on the friction coefficient in these three bearing system configurations. The existence of the small dimples of the produced surface texture generates hydrodynamic pressure, stabilizes or reduces friction. A shaft and bushing system with a regular machined finish (as known in the art) is exposed to more asperity-to-asperity contact so that the friction in this bearing system configuration shows a large variation. For a shot-peened shaft and/or bushing system (two implementations illustrated), however, the micro-dimples provide more reservoirs for grease to lubricate the rubbing surfaces. Meanwhile, the grease contained in the dimples will generate hydrodynamic pressure to separate the friction couple better. Therefore, the friction tends to be more stable or reduced.

FIGS. 14 and 15 differ only in the manner with which the illustrated data is identified and presented.

Figure 16:
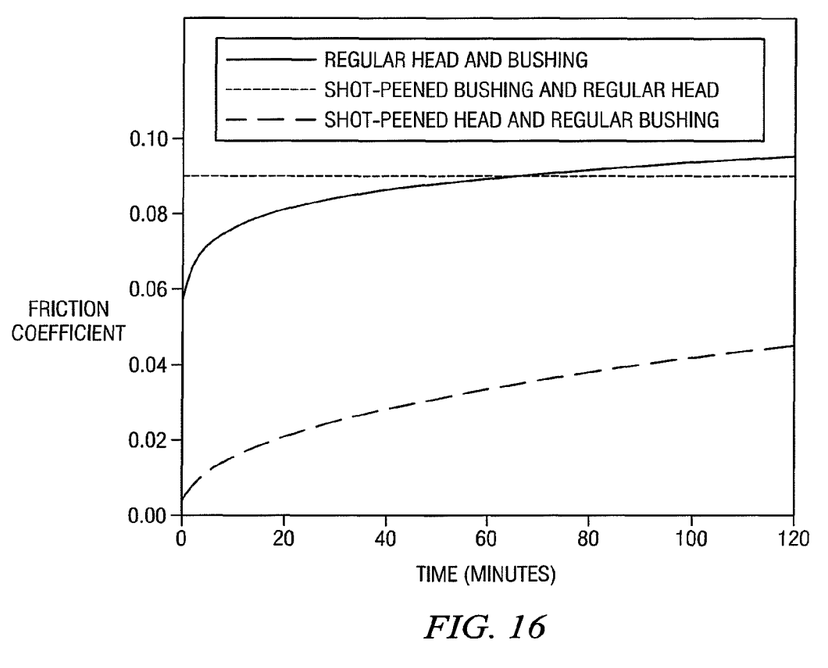

Reference is now made to FIG. 16 which also illustrates the effect shot peening in accordance with the two-step process described above has on the friction coefficient in these three bearing configurations. FIG. 16 illustrates the same information as presented in FIGS. 14 and 15, but the presentation is made in a different way. The FIG. 16 illustration loses some information shown in FIGS. 14-15 concerning friction variation in the regular head and bushing system and its deduction in a shot-peened head and bushing system. Nonetheless, the frictional benefits of the surface textured finishes for the bearing system as described herein are evident.

In summary, a surface textured head bearing is presented for use in a rock bit. Tiny dimples are created by a two-step shot peening process on one or more surfaces of interest in connection with the bearing system (for example, in the main journal bearing). The dimples of random distribution and non-uniform size are formed over the surface of interest (at least 60% coverage area) and work as reservoirs to constrain more lubricant in the surface contact zone. Hydrodynamic pressure is generated in the dimple area and the bearing friction is reduced. Correspondingly, the bearing working condition is improved.

Figure 17:
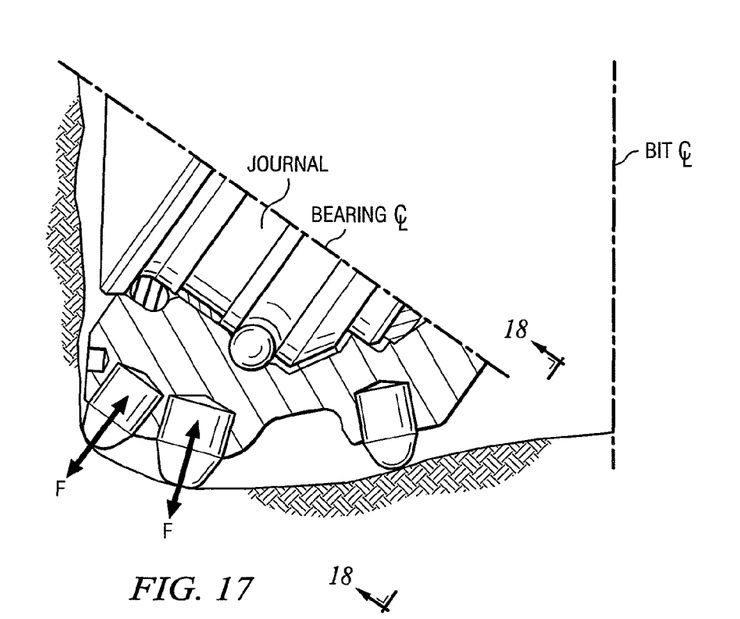
FIG. 17 illustrates a partially broken away view of a roller cone rock bit when operating in a formation.

Reference is now made to FIG. 17 which illustrates a partially broken away view of a roller cone rock bit when operating in a formation. During operation of the bit, forces F are exerted through the cutting elements of cone onto the journal. However, it will be noted that the forces are exerted onto a loading zone of the bearing surface which is smaller than the overall circumferential surface. For example, the loading zone may comprise only one-quarter (about 90°) of the circumferential surface of the bearing.

Figure 18:
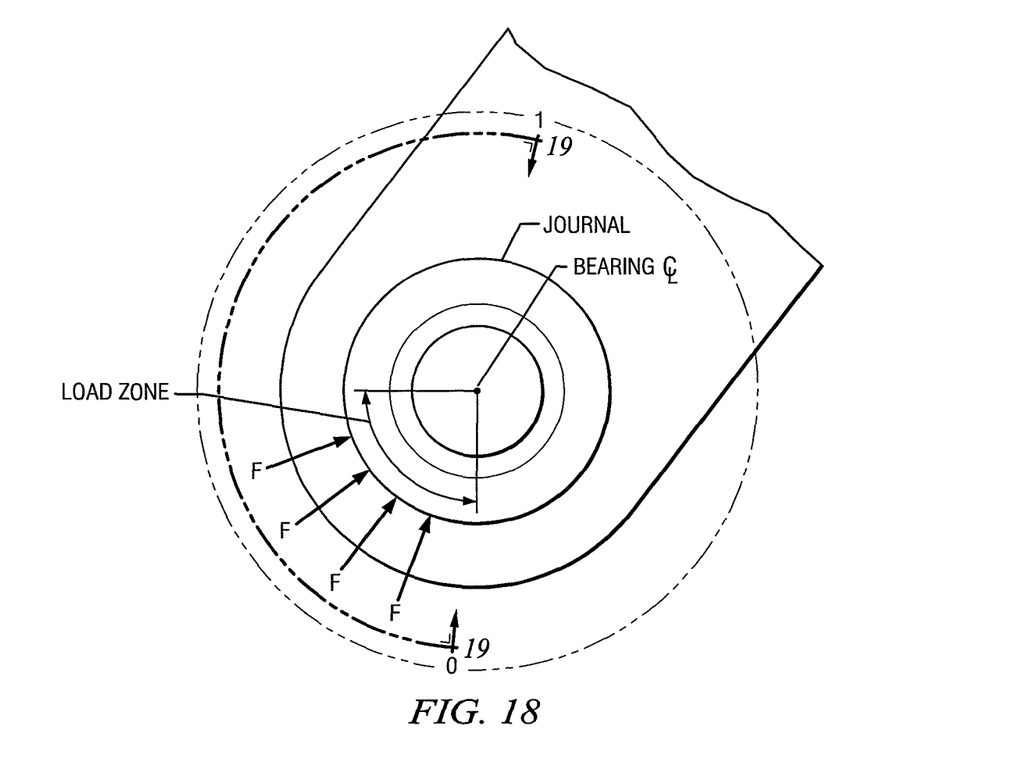
FIG. 18 illustrates a cross-section taken through a journal bearing.

Reference is now made to FIG. 18 which illustrates a cross-section taken through the journal bearing (for example, through the first cylindrical friction bearing 10 or main journal bearing) perpendicular to the axis 141 of cone rotation. The reference arrows 18-18 in FIG. 17 illustrate generally the angle of the view, but do not specifically identify where the cross-section was taken. It will be seen that the loading zone is approximately one-quarter (about) 90° of the circumferential surface of the bearing surface (journal surface for the main bearing). The forces F from engaging the formation (FIG. 17) are exerted on the bearing surface primarily (if not exclusively) in this area. It is accordingly this loading zone of the bearing surface which needs to be protected against friction damage.

In one embodiment, it is only this loading zone of the bearing surface which receives the surface texturing previously described. Thus, the surface of the bearing in the region of the arc identified as loading zone would receive texturing while the remaining surfaces would receive no texturing. It will accordingly be noted that this illustrates a different form of coverage area percentage than that which was previously explained. Coverage area in connection with this implementation will be referred to as intermittent coverage of the bearing surface and can also be expressed in terms of a percentage. In this case, the percentage (for example, about 25% for the one-quarter surface coverage example provided) refers to the portion of the surface which receives any form of texturing, versus the portion of the surface which receives no texturing at all.

Figure 19:
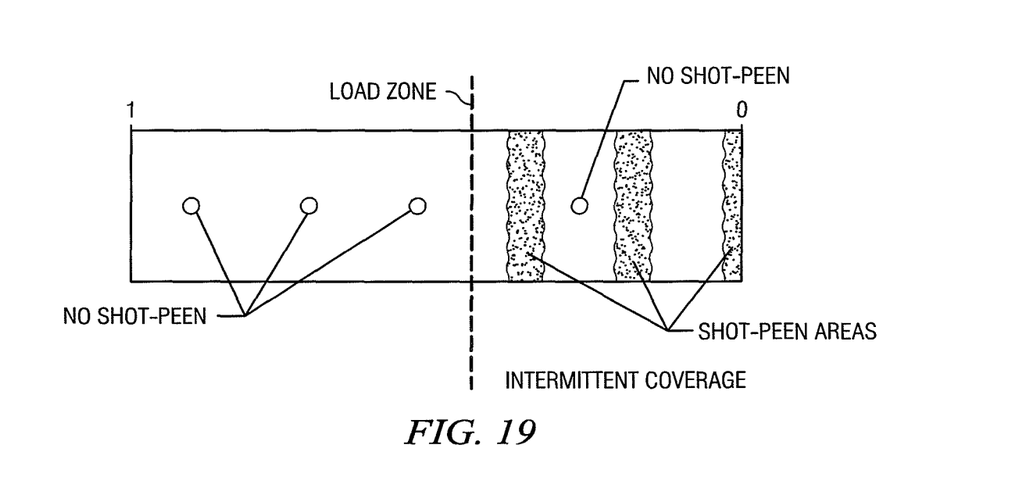
FIG. 19 illustrates an alternative form of intermittent surface texturing.

Reference is now made to FIG. 19 which illustrates the bearing surface, unwrapped, from point 0 to point 1 of the arc 19-19 shown in FIG. 18. Within the load zone (right hand side of the unwrapped surface), there is provided surface texturing of an intermittent nature. As discussed above, all of the surface in the load zone can be surface textured in the manner described herein. FIG. 19 specifically illustrates an alternative form of intermittent surface texturing. One or more distinct and separated surface textured regions can be provided within the load zone on the bearing surface. Each of these regions can be formed using the surface texturing techniques described herein. The regions may take the form of strips, as shown in FIG. 19, which extend parallel to the axis of cone rotation. Even further, these strips can be aligned with the locations where forces F are being exerted against the journal bearing. The circumferential area to the left of the unwrapped surface receives no surface texturing treatment at all. Furthermore, areas of the surface between the regions receive no surface texturing treatment at all. Again, as discussed above, coverage area in connection with this implementation (intermittent coverage of the bearing surface) is expressed in terms of a percentage. In this case, the percentage (for example, about 12-15% for the textured regions within the one-quarter surface loading zone example provided) refers to the portion of the surface which receives any form of texturing, versus the portion of the surface which receives no texturing at all.

Embodiments of the invention have been described and illustrated above. The invention is not limited to the disclosed embodiments.

What is claimed is:

1. A method for building a drill bit, comprising:
   forming a journal bearing structure of a drill bit having a bearing system including at least one bearing surface; and
   surface texturing at least a portion of the bearing surface of the bearing system, wherein surface texturing comprises:
   exposing the portion of the bearing surface to a first shot peening action wherein the portion of the surface is bombarded at a first intensity level by first small spherical media of a first average size;
   exposing the same portion of the bearing surface to a subsequent second shot peening action wherein the same portion of the beating surface is bombarded at a second intensity level by second small spherical media of a second average size; and
   wherein the first and subsequent second shot peening actions create lubricant reservoirs on the same portion of the bearing surface, the lubricant reservoirs being adapted to contain lubricant for the bearing system; and
   wherein the first intensity level is greater than the second intensity level and the first average size is larger than the second average size.

2. The method of claim 1 wherein the portion is less than an overall circumferential surface for the bearing surface.

3. The method of claim 2 wherein the surface textured portion is formed as a plurality of strips on the bearing surface.

4. The method of claim 3 wherein the surface textured portion is a load bearing portion of the bearing surface and the strips align with load forces applied against the bearing surface.

5. The method of claim 2 wherein the portion is a load bearing portion of the bearing surface.

6. The method of claim 1 wherein the bearing surface is a thrust surface.

7. The method of claim 6 wherein the thrust surface is of a radial kind.

8. The method of claim 1 wherein the bearing surface is a journal surface.

9. The method of claim 8 wherein the journal surface is of a cylindrical kind.

10. The method of claim 1 wherein the journal bearing structure includes a bearing bushing and the portion of the bearing surface is one of an inside or outside surface of the bushing.

11. The method of claim 1 wherein the journal bearing structure includes a bearing shaft and the bearing surface is an outer surface of the shaft.

12. The method of claim 1 wherein the subsequent second shot peening action compacts edges of the surface texture formed by the first shot peening action.

13. The method of claim 1 wherein the second average size is less than 0.011 inches.

14. The method of claim 1 wherein the first intensity level is in a range of 0.007-0.010 inches measured on a C-type Almen strip and the second intensity level is in a second range of 0.007-0.010 inches measured on an A-type Almen strip.

15. A method of fabricating a drill bit, comprising:
    forming a shaft including a sealing surface and a bearing surface;
    forming a roller cone having an annular gland;
    rotatably mounting the roller cone to the shaft such that a bushing on the roller cone aligns with the bearing surface and the annular gland aligns with the sealing surface;
    shot peening in a first shot peening action the bearing surface of the shaft or an inner surface of the bushing at a first intensity level by a first small spherical media of a first average size;
    shot peening in a second subsequent shot peening action the bearing surface of the shaft or the inner surface of the bushing at a second intensity level by a second small spherical media of a second average size;
    wherein the first intensity level is greater than the second intensity level and the first average size is larger than the second average size; and
    wherein the first and second subsequent shot peening actions create lubricant reservoirs on the bearing surface of the shaft or the inner surface of the bushing, the lubricant reservoirs being adapted to contain lubricant.

16. The method of claim 15 wherein, following completion of the second shot peening action, more than 60% of the bearing surface of the shaft or of the inner surface of the bushing has been textured with dimples.

17. The method of claim 16 wherein, following completion of the second shot peening action, 70-90% of the bearing surface of the shaft or of the inner surface of the bushing has been textured with dimples.

18. The method of claim 16 wherein, following completion of the second shot peening action, substantially 100% of the bearing surface of the shaft or of the inner surface of the bushing has been textured with dimples.

19. A method of fabricating a drill bit, comprising:
    forming a shaft including a sealing surface and a bearing surface;
    forming a roller cone having an annular gland;
    rotatably mounting the roller cone to the shaft such that a bushing on the roller cone aligns with the bearing surface and the annular gland aligns with the sealing surface;
    forming a plurality of dimples by:
    shot peening in a first shot peening action the bearing surface of the shaft or an inner surface of the bushing at a first intensity level by a first small spherical media of a first average size;
    shot peening in a second subsequent shot peening action the bearing surface of the shaft or the inner surface of the bushing at a second intensity level by a second small spherical media of a second average size;
    wherein the first intensity level is greater than the second intensity level and the first average size is larger than the second average size; and
    wherein the first and second subsequent shot peening actions form lubricant reservoirs on the bearing surface of the shaft or the inner surface of the bushing, the lubricant reservoirs being adapted to contain lubricant for a drill bit; and wherein the plurality of dimples provide intermittent coverage.

20. The method of claim 19 wherein the intermittent coverage is provided on a region which is a load bearing portion of the bearing surface or of the inner surface of the bushing.

21. The method of claim 20 wherein the intermittent coverage is formed as strips on the bearing surface or on the inner surface of the bushing.

22. The method of claim 21 wherein the region is a load bearing portion of the bearing surface or of the inner surface of the bushing and the strips align with the load forces applied against the bearing surface or against the inner surface of the bushing.

23. The method of claim 19 wherein the intermittent coverage is provided on a region which is less than an overall circumferential surface for the bearing surface or for the inner surface of the bushing.

* * * * *

UNITED STATES PATENT AND TRADEMARK OFFICE
CERTIFICATE OF CORRECTION

PATENT NO. : 8,418,332 B2
APPLICATION NO. : 12/398730
DATED : April 16, 2013
INVENTOR(S) : Xiaobin Lu It is certified that error appears in the above-identified patent and that said Letters Patent is hereby corrected as shown below:

In the Claims:

At Column 10, claim number 1, line number 39, please replace the word [beating] with the word -- bearing --.

Signed and Sealed this
Twenty-eighth Day of May, 2013

Teresa Stanek Rea
*Acting Director of the United States Patent and Trademark Office*